(12) United States Patent
Kamatani

(10) Patent No.: US 7,312,940 B2
(45) Date of Patent: *Dec. 25, 2007

(54) MAGNETIC TRANSFER APPARATUS

(75) Inventor: Akito Kamatani, Odawara (JP)

(73) Assignee: Fujifilm Corporation, Tokyo (JP)

( * ) Notice: Subject to any disclaimer, the term of this patent is extended or adjusted under 35 U.S.C. 154(b) by 770 days.

This patent is subject to a terminal disclaimer.

(21) Appl. No.: 10/760,391

(22) Filed: Jan. 21, 2004

(65) Prior Publication Data

US 2004/0150902 A1    Aug. 5, 2004

(30) Foreign Application Priority Data

Jan. 28, 2003    (JP)    ............... 2003/018989

(51) Int. Cl.
*G11B 5/86*    (2006.01)
(52) U.S. Cl. .................. 360/17; 360/16; 360/15; 428/800
(58) Field of Classification Search .......... 360/17, 360/16, 15, 133, 48, 97.02, 97.03, 97.04; 369/84; 428/694 SG, 694 R, 826, 800
See application file for complete search history.

(56) References Cited

U.S. PATENT DOCUMENTS

| | | | |
|---|---|---|---|
| 6,347,016 B1* | 2/2002 | Ishida et al. .................. 360/17 |
| 6,839,192 B2* | 1/2005 | Kamatani .................. 360/17 |
| 6,914,736 B2* | 7/2005 | Kamatani .................. 360/17 |
| 6,940,668 B2* | 9/2005 | Kamatani .................. 360/17 |
| 6,947,231 B2* | 9/2005 | Kamatani .................. 360/17 |
| 2002/0030909 A1 | 3/2002 | Aoki et al. | |

FOREIGN PATENT DOCUMENTS

JP        2002-367161 A        12/2002

* cited by examiner

*Primary Examiner*—Ali Neyzari
(74) *Attorney, Agent, or Firm*—Sughrue Mion, PLLC

(57) ABSTRACT

A magnetic transfer apparatus is provided with a transfer holder. A master information carrier and a slave medium are accommodated in the transfer holder in an overlapping state where they are opposed to each other and held in close contact with each other. The master information carrier and the slave medium overlapping each other are pressed against each other by hermetically closing the holder and evacuating the inner space of the holder.

5 Claims, 3 Drawing Sheets

MAGNETIC TRANSFER APPARATUS

BACKGROUND OF THE INVENTION

1. Field of the Invention

This invention relates to a magnetic transfer apparatus in which information carried by a master information carrier is magnetically transferred to a slave medium.

2. Description of the Related Art

This invention is applied to a magnetic transfer where a magnetization pattern representing information carried by a master information carrier (a patterned master) is transferred to a slave medium having a magnetic recording portion by applying a transfer magnetic field to the master information carrier and the slave medium in close contact with each other. The master information carrier (a patterned master) has a magnetic layer at least on the surface thereof and carries an embossed pattern (a pattern of protruding portions and recessed or not-protruded-portions) or an embedded structure representing a transferred pattern representing the information to be transferred to the slave medium such as a servo signal.

When the slave medium is a disk medium such as a hard disk or a high-density flexible disk, the master information carrier is held in close contact with one or each side of the slave medium and the transfer magnetic field is applied to the slave medium and the master information carrier(s) in this state by a magnetic field application means comprising an electromagnet or a permanent magnet disposed on one or each side of the slave medium/master information carrier assembly.

In order to transfer the information in a good quality, it is important to hold the slave medium and the master information carrier in uniform close contact with each other. That is, when there is defect in close contact between the slave medium and the master information carrier, there is generated an area where no magnetic transfer occurs, which results in a signal missing in the information transferred to the slave medium and deterioration in quality of the signal transferred. When the transferred information is a servo signal, the signal missing results in an unsatisfactory tracking and deteriorates the reliability of the slave medium.

In the magnetic transfer, placing the slave medium and the master information carrier in a holder comprising a pair of holder halves which can be moved toward each other to hold the slave medium and the master information carrier in close contact with each other is advantageous in holding the slave medium and the master information carrier in close contact with each other uniformly over the entire area. See, for instance, U.S. patent Laid-Open No. 2002/030909.

In the holder, the master information carrier and the slave medium are brought into close contact with each other and pressed against each other generally by fastening by the use of screws or by mechanical pressing by the use of a power source such as an air cylinder or an electric motor.

There has been proposed a magnetic transfer apparatus in which a slave medium is received in a recess formed on one side of a holder and a flexible master information carrier is placed on the recess to hermetically close the recess, and the inner space of the recess is evacuated so that the master information carrier is deformed to be brought into close contact with the slave medium under vacuum. See, for instance, Japanese Unexamined Patent Publication No. 2002-367161.

In the conventional magnetic transfer apparatus, the holder must be high in rigidity in order to push by a power source the master information carrier and/or the slave medium toward each other to press them against each other and to cause the pushing force to act over the entire area of the master information carrier and/or the slave medium. On the other hand, it is advantageous to dispose the magnet as close to the slave medium/master information carrier assembly as possible in order to apply the transfer magnetic field. This limits the thickness of the holder wall. Accordingly, the rigidity of the holder becomes insufficient to uniformly press the master information carrier and the slave medium against each other.

In the case where the power source acts on the central axis of the slave medium/master information carrier assembly, though the central portions of the slave medium and the master information carrier can be applied with a large pressure, the peripheral portions of the slave medium and the master information carrier are applied with a smaller pressure, and accordingly, it is difficult to apply a uniform pressure.

On the other hand, in a magnetic transfer apparatus in which a slave medium is received in a recess formed on one side of a holder and a flexible master information carrier is placed on the recess to hermetically close the recess, and the inner space of the recess is evacuated so that the master information carrier is deformed to be brought into close contact with the slave medium under vacuum as disclosed in Japanese Unexamined Patent Publication No. 2002-367161, very high precision is required in making the master information carrier and the portion of the holder on which the master information carrier is rested. Small fluctuation in the height of the portion of the holder on which the master information carrier is rested can result in defective close contact between the slave medium and the master information carrier. When the master information carrier is deformed each time the inner space of the recess is evacuated due to fluctuation in the height of the portion of the holder on which the master information carrier is rested, the service life of the master information carrier, which is expensive, can be shortened. Further, this mechanism is disadvantageous in that the master information carrier and the slave medium cannot be pressed against each other at a pressure higher than the atmospheric pressure.

SUMMARY OF THE INVENTION

In view of the foregoing observation and description, the primary object of the present invention is to provide a magnetic transfer apparatus which can uniformly press against each other the slave medium and the master information carrier held overlapped in a holder so that the information can be transferred to the slave medium from the master information carrier in a good quality without increasing the thickness of the wall of the holder.

In accordance with the present invention, there is provided a magnetic transfer apparatus provided with a transfer holder in which a master information carrier and a slave medium are accommodated in an overlapping state where they are opposed to each other and held in close contact with each other, wherein the improvement comprises that the master information carrier and the slave medium overlapping each other are pressed against each other by hermetically closing the holder and evacuating the inner space of the holder.

Preferably, the transfer holder comprises at least two parts, first and second holder halves so that the first and second holder halves are moved relatively to each other in response to evacuation of the inner space of the transfer holder to press against each other the master information carrier and the slave medium overlapping each other. The first and second holder halves are connected by a seal mechanism.

It is preferred that at least one elastic member be disposed between the transfer holder and at least one of the master information carrier and the slave medium overlapping each other.

A mechanical pressure by a power source may be applied to the transfer holder in addition to the pressure by said evacuation.

The pressure applied to the master information carrier and the slave medium by said evacuation can be controlled by changing the evacuating area by changing the radial position of the connection between the first and second holder halves.

In the magnetic transfer apparatus in accordance with the present invention, since the master information carrier and the slave medium overlapping each other in a transfer holder are pressed against each other by hermetically closing the holder and evacuating the inner space of the holder, the master information carrier and the slave medium can be pressed against each other uniformly over the entire area without increasing the wall thickness of the transfer holder.

When at least one elastic member is disposed between at least one of the master information carrier and the slave medium overlapping each other and the master information carrier and the slave medium are pressed against each other by way of the elastic member, the master information carrier and the slave medium can be uniformly pressed against each other less depending upon the dimensional accuracy of the transfer holder.

When a mechanical pressure by a power source is applied to the transfer holder in addition to the pressure by said evacuation, unevenness in pressure can be more suppressed and the master information carrier and the slave medium can be more uniformly pressed against each other.

DESCRIPTION OF THE PREFERRED EMBODIMENTS

Figure 1:
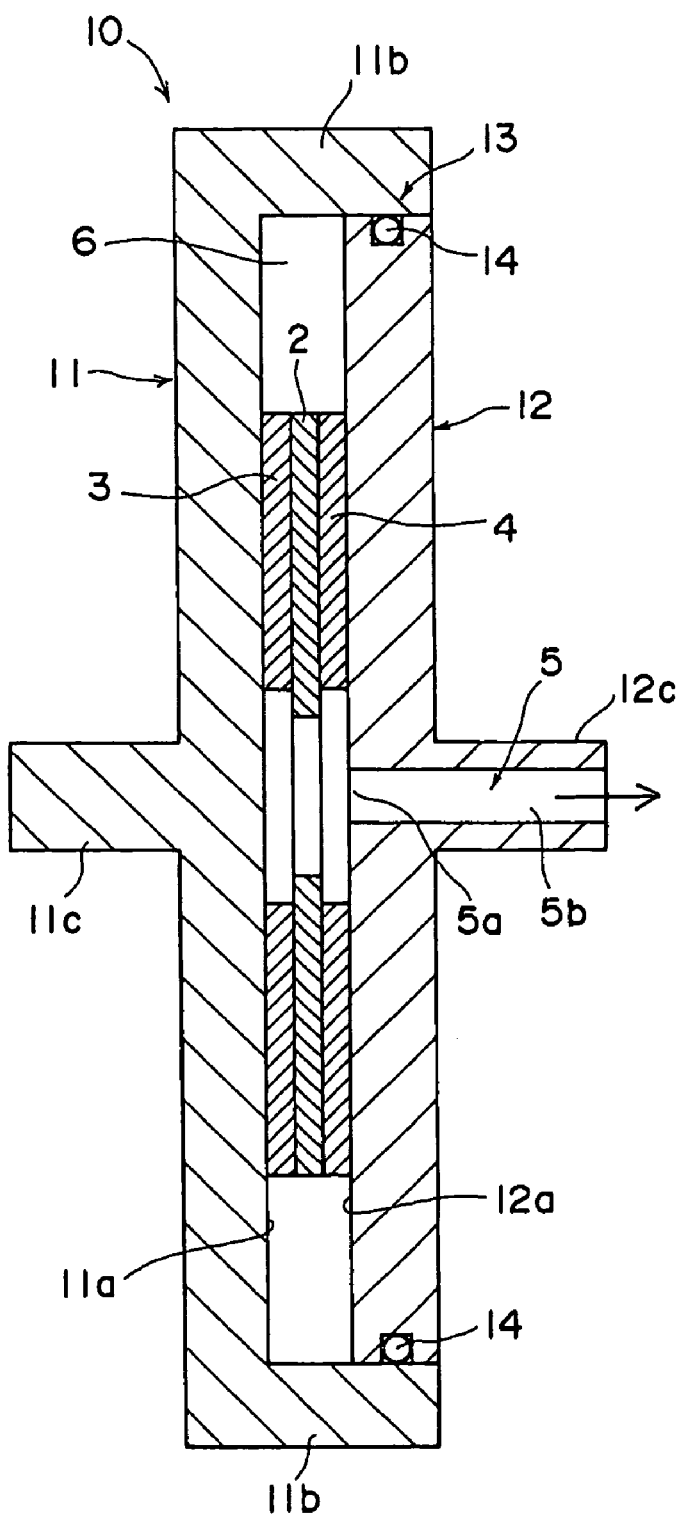
FIG. 1 is a cross-sectional view of a transfer holder of a magnetic transfer apparatus in accordance with an embodiment of the present invention.

A transfer holder 10 shown in FIG. 1 is for transferring a pair of pieces of information respectively carried by a pair of master information carriers simultaneously to opposite sides of one slave medium. In FIG. 1, the transfer holder 10 comprises a pair of holder halves, a left holder half 11 and a right holder half 12. The left and right holder halves 11 and 12 are movable relatively to each other and moved toward each other to form an inner space 6 therebetween. The inner space 6 is hermetically sealed by a seal mechanism 13 and a slave medium 2 and a pair of master information carriers, a left master information carrier 3 and a right master information carrier 4, are placed in a state where the master information carriers 3 and 4 held in close contact with opposite sides of the slave medium 2 and centered to the slave medium 2. The expression that the master information carrier is held in close contact with the slave medium should be broadly interpreted to include both the states where the master information carrier and the slave medium are held in contact with each other, and the master information carrier and the slave medium are held at a slight space from each other.

The magnetic transfer apparatus is further provided with a vacuum means 5 which evacuates air in the inner space 6 of the transfer holder 10 and presses the master information carriers 3 and 4 against opposite sides of the slave medium 2 under vacuum, and a magnetic field application means (not shown) which applies a transfer magnetic field to the slave medium 2 and the master information carriers 3 and 4 while rotating the transfer holder 10.

The inner surface 11a of the left holder half 11 forms a reference surface and the left master information carrier 3 and the slave medium 2 to one side of which the information carried by the left master information carrier 3 is transferred are held on the inner surface 11a of the left holder half 11. The right master information carrier 4 carrying thereon the information to be transferred to the other side of the slave medium 2 is held on the inner surface 12a of the right holder half 12.

That is, the left holder half 11 of the transfer holder 10 is like a disk in shape and has a circular inner surface 11a which is larger than the master information carriers 3 and 4, and the back side of the left master information carrier 3 is held on the central portion of the inner surface 11a, for instance, under vacuum. Further, the slave medium 2 is held on the front side of the left master information carrier 3, for instance, under vacuum. The right holder half 12 of the transfer holder 10 is like a disk in shape and has a circular inner surface 12a which is larger than the master information carriers 3 and 4, and the back side of the right master information carrier 4 is held on the central portion of the inner surface 12a, for instance, under vacuum.

The seal mechanism 13 connecting the left and right holder halves 11 and 12 comprises an annular collar portion 11b axially projecting from the peripheral edge of the left holder half 11, a seal member (an O-ring) 14 mounted on the outer peripheral surface of the right holder half 12. The outer diameter of the right holder half 12 is smaller than the diameter of the inner peripheral surface of the annular collar portion 11b so that the right holder half 12 can be received in the collar portion 11b of the left holder half 11. When the left and right holder halves 11 and 12 are moved toward each other, the seal member 14 on the outer peripheral surface of the right holder half 12 is brought into sliding contact with the inner peripheral surface of the annular collar portion 11b of the left holder half 11 so that the inner space is hermetically closed while permitting the left and right holder halves 11 and 12 to be moved relatively to each other.

A left support shaft 11c is erected from the outer side of the left holder half 11 at its center and a right support shaft 12c is erected from the outer side of the right holder half 12 at its center. The left and right support shafts 11c and 12c are supported by the magnetic transfer apparatus body. The left and right holder halves 11 and 12 are connected to a rotating mechanism (not shown) and are integrally rotated about the left and right support shafts 11c and 12c upon magnetic transfer.

The vacuum means 5 which evacuates the inner space 6 is provided with a vacuum port 5a which opens in the central portion of the inner surface 12a of the right holder half 12. The vacuum port 5a is connected to a vacuum pump (not shown), which is disposed outside the transfer holder 10, by way of an air passage 5b passing through the support shaft 12c of the right holder half 12. The vacuum port 5a may be opened in the inner surface 12a outside the master information carrier 4. The inner space 6 formed between the left and right holder halves 11 and 12 is evacuated to a predetermined degree of vacuum by the vacuum means 5, whereby the left and right master information carriers 3 and 4 are pressed against the respective sides of the slave medium 2 at a predetermined pressure.

The pressure applied to the master information carriers 3 and 4 and the slave medium 2 by said evacuation can be controlled by changing the evacuating area by changing the radial position of the connection between the first and second holder halves 11 and 12. That is, by changing the ratio of the evacuating area of the transfer holder 10 (the outer diameter of the right holder half 12) and the contact area between the master information carriers 3 and 4 and the slave medium 2, the pressure applied to the master information carriers 3 and 4 and the slave medium 2 for a given degree of vacuum can be changed.

When carrying out the magnetic transfer, the slave medium 2 is DC-magnetized in advance in a direction of recording tracks in the case of the in-plane recording or in a direction perpendicular to recording tracks in the case of the perpendicular recording. Then the master information carriers 3 and 4 are bought into close contact with the DC-magnetized slave medium 2 and a transfer magnetic field is applied to the slave medium 2 and the master information carriers 3 and 4 in the direction opposite to the direction of the initial DC-magnetization.

A magnetic recording disc such as a hard disc or a high-density flexible disc provided with a magnetic recording portion (a magnetic layer) on each side thereof is generally employed as the slave medium 2. The magnetic recording portion is generally of a coated magnetic layer or a metal film type magnetic layer.

The master information carrier 3 or 4 is like a disk in shape and comprises a substrate formed with a fine embossed pattern on its surface and a magnetic layer formed over the embossed pattern. The surface of the substrate carrying thereon the embossed pattern and the magnetic layer forms the information carrying surface on which the transferred pattern is formed and which is brought into close contact with the slave medium 2.

The substrate of the master information carrier may be formed, for instance, of, nickel, silicon, quartz, aluminum, alloys, ceramics, synthetic resin or the like. The embossed pattern may be formed, for instance, by a stamper method. The magnetic layer may be formed by, for instance, vacuum film forming techniques such as vacuum deposition, sputtering or ion plating or a plating method. Substantially the same master information carrier can be used in both the in-plane recording and the perpendicular recording.

The magnetic field application means for applying the transfer magnetic field and the initial magnetic field comprises, for instance, a pair of ring type electromagnets each disposed on one side of the holder. Each of the electromagnets comprises a core having a gap extending in a radial direction of the slave medium 2 and a winding wound around the core. In the case of the in-plane recording, the ring type electromagnets on opposite sides of the holder 10 applies magnetic fields in the same direction in parallel to the tracks. The magnetic field application means applies a magnetic field to the slave medium 2 and the master information carriers 3 and 4 while rotating the holder 10 to apply the magnetic field over the entire area of the slave medium 2 and the master information carrier. Instead of rotating the holder 10, the magnetic field application means maybe rotated. The magnetic field application means may be disposed only on one side of holder 10 or on each side of the same. A permanent magnet may be employed in place of the electromagnets.

In the case of the perpendicular recording, a pair of electromagnets or a permanent magnets different in polarity are disposed on opposite sides of the holder 10 so that a magnetic field is generated in perpendicular to the tracks. When the magnetic field application means is of a type which applies a magnetic field only a part of the slave medium 2 and the master information carriers 3 and 4, the holder 10 or the magnetic field is moved so that a magnetic field is applied to the slave medium 2 and the master information carriers 3 and 4 over the entire area thereof.

In the magnetic transfer apparatus, the same information is transferred to a plurality of slave media 2 from the same master information carriers 3 and 4, and the left and right master information carriers 3 and 4 are first placed in place in the left and right holder halves 11 and 12. Then, with the left and right holder halves 11 and 12 held away from each other, a slave medium 2 which has been initial-magnetized in an in-plane direction or a perpendicular direction is set on the left master information carrier 3 in the left holder half 11 so that the center of the slave medium 2 is aligned with the center of the left master information carrier 3, and the holder 10 is closed, or the left and right holder halves 11 and 12 are moved toward each other.

As the left and right holder halves 11 and 12 are moved toward each other, the seal member 14 of the right holder half 12 comes to abut against the inner peripheral surface of the collar portion 11b of the left holder half 11 for a sliding motion and hermetically closes the inner space 6 in which the slave medium 2 and the master information carriers 3 and 4 are accommodated. Air in the inner space 6 is evacuated by the vacuum means 5 so that the inner space 6 is evacuated to a predetermined degree of vacuum, whereby the left and right holder halves 11 and 12 are moved toward each other and the left and right master information carriers 3 and 4 overlaid on the slave medium 2 are pressed against the respective sides of the slave medium 2. With this arrangement, the right holder half 12 presses the master information carriers 3 and 4 against the respective sides of the slave medium 2 into close contact with the slave medium 2 under a predetermined contact pressure and purges air between the slave medium 2 and the master information carriers 3 and 4 to improve contact therebetween by an external force (atmospheric pressure) acting according to the degree of vacuum.

Then the magnetic field application means is moved close to the transfer holder 10 and applies a transfer magnetic field to the holder 10 in a direction substantially opposite to the direction of the initial magnetization while rotating the holder 10, whereby magnetization patterns representing the information carried by the master information carriers 3 and 4 are recorded on the respective recording portions of the slave medium 2.

The transfer magnetic field is absorbed in the protruding portion of the embossed pattern on the master information carrier 3 or 4 in close contact with the slave medium 2. In the case of in-plane recording, the initial magnetization of the part of the slave medium 2 in contact with the protruding portion of the embossed pattern is not reversed but the initial magnetization of the other part of the slave medium 2 is reversed, whereas in the case of perpendicular recording, the initial magnetization of the part of the slave medium 2 in contact with the protruding portion of the embossed pattern is reversed and the initial magnetization of the other part of the slave medium 2 is not reversed, whereby a magnetization pattern corresponding to the embossed pattern on the master information carrier 3 or 4 is recorded on (or transferred to) the slave medium 2.

In accordance with this embodiment, since the assembly of the slave medium 2 and the master information carriers 3 and 4 overlaid on opposite sides of the slave medium 2 are accommodated in the transfer holder 10 of a cylinder-piston structure comprising the left holder half 11 which is like a cylinder and the right holder half 12 which is received in the left holder half 11 for a sliding motion like a piston and the overlapping slave medium 2 and the master information carriers 3 and 4 are pressed into close contact with each other by pressure generated by evacuating the inner space 6 formed between the holder halves 11 and 12, the master information carriers 3 and 4 are uniformly brought into close contact with the slave medium 2, whereby close contact between the master information carriers 3 and 4 and the slave medium 2 is improved and good magnetic transfer can be carried out preventing defect in transfer due to defect in close contact between the slave medium 2 and the master information carriers 3 and 4.

A mechanical pressure by a power source may be applied to the transfer holder in addition to the pressure by said evacuation of the inner space 6 of the transfer holder 10. For example, a pressure cylinder may be provided so that its pressure rod presses the support shaft 11c or 12c of the transfer holder 10.

If the pressure by the evacuation is increased by increasing the outer diameter of the transfer holder 10 so that the evacuating area is increased and the ratio of the evacuating area to the contact area between the master information carrier and the slave medium is increased, the pressure tends to be higher at the outer periphery of the holder 10. Accordingly, by the use of the mechanical pressure by a power source, which acts on the support shaft 11c or 12c from the exterior, together with the pressure by the evacuation, the pressure acting on the inner periphery of the slave medium 2 and the master information carriers 3 and 4 can be increased and unevenness in pressure can be suppressed, whereby the master information carriers 3 and 4 can be more uniformly pressed against the slave medium 2.

Figure 2:
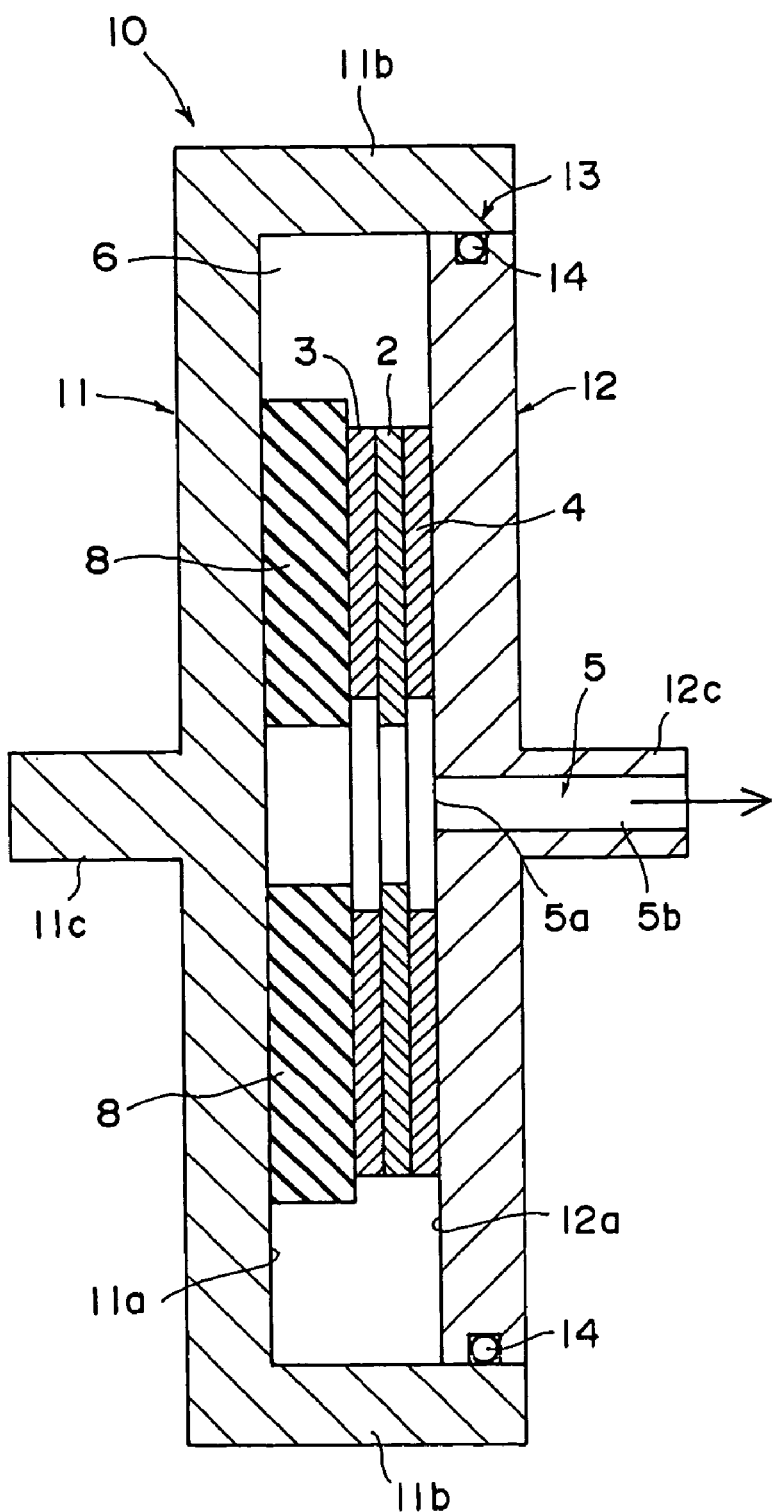
FIG. 2 is a cross-sectional view of a transfer holder of a magnetic transfer apparatus in accordance with another embodiment of the present invention.
Figure 3:
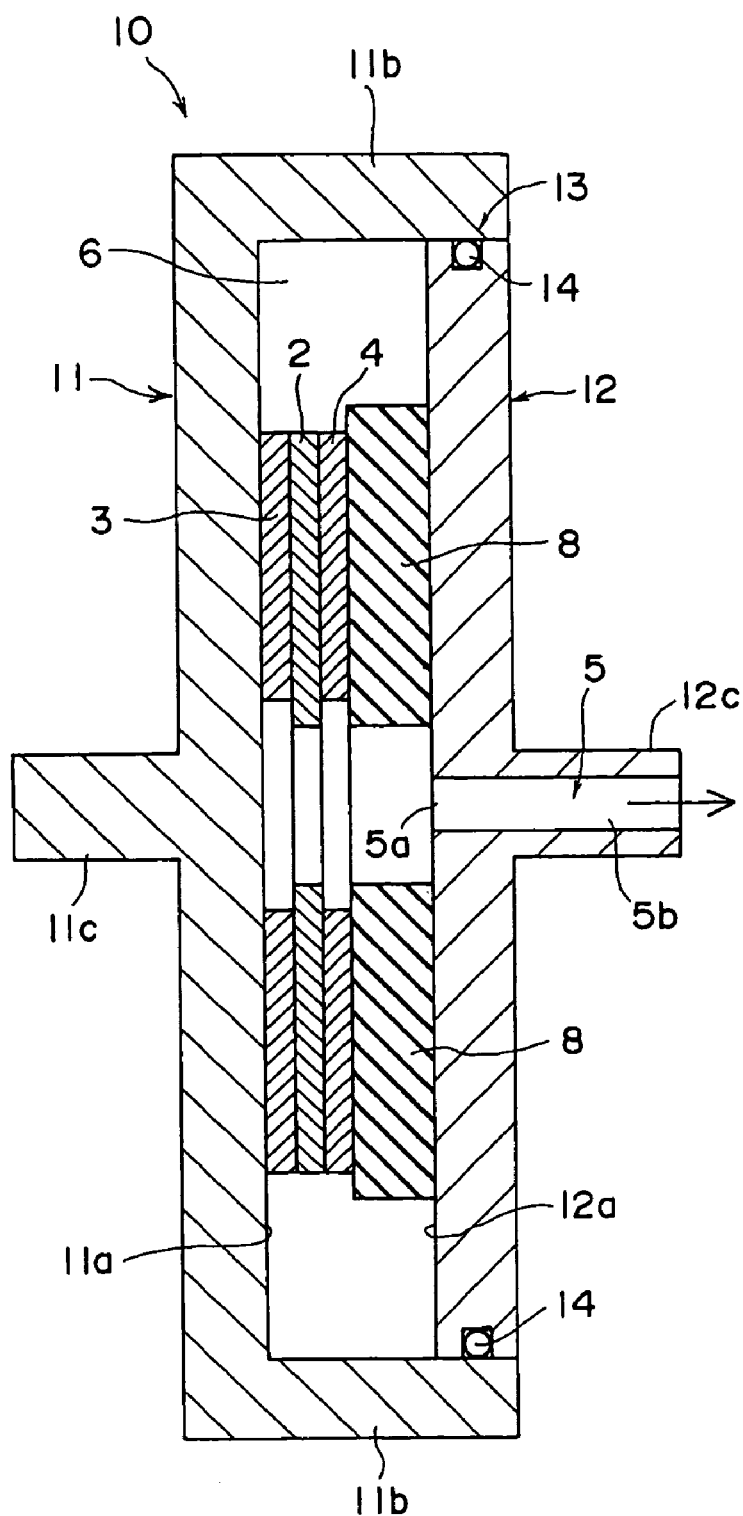
FIG. 3 is a cross-sectional view of a transfer holder of a magnetic transfer apparatus in accordance with still another embodiment of the present invention.

FIGS. 2 and 3 are cross-sectional views respectively showing transfer holders 10 in accordance with other embodiments of the present invention. The embodiments are basically the same as that of the preceding embodiment except that the overlapping slave medium 2 and the master information carriers 3 and 4 are pressed against each other by way of an elastic member 8, and accordingly, the analogous elements are given the same reference numerals and will not be described here.

In the embodiment shown in FIG. 2, an elastic member 8 in the form of a sheet is provided on the inner surface 11a of the left holder half 11, and the left master information carrier 3 is held on the elastic member 8. When the left and right master information carriers 3 and 4 are pressed against the respective sides of the slave medium 2, the elastic member 8 is deformed so that the left and right master information carriers 3 and 4 are pressed against the respective sides of the slave medium 2 under a predetermined pressure.

In the embodiment shown in FIG. 3, an elastic member 8 in the form of a sheet is provided on the inner surface 12a of the right holder half 12, and the right master information carrier 4 is held on the elastic member 8. When the left and right master information carriers 3 and 4 are pressed against the respective sides of the slave medium 2, the elastic member 8 is deformed so that the left and right master information carriers 3 and 4 are pressed against the respective sides of the slave medium 2 under a predetermined pressure.

Deformation of the elastic member 8 absorbs deviation in parallelism between the inner surfaces 11a and 12a of the left and right holder halves 11 and 12 and brings the master information carriers 3 and 4 into uniform contact with the respective sides of the slave medium 2. The elastic member 8 is like a disk in shape and formed of elastic material such as general rubbers including, for instance, silicone rubber, polyurethane rubber, fluororubber, and butadiene rubber, foamed resins such as sponge rubber, or the like.

The elastic member 8 may be provided on each of the left and right holder halves 11 and 12. Depending on the thickness, rigidity and/or the like of the slave medium 2 and master information carriers 3 and 4, whether the elastic member 8 is to be provided only on one of the left and right holder halves 11 and 12 or on both of the left and right holder halves 11 and 12 is determined so that the contact between the slave medium 2 and the master information carriers 3 and 4 becomes closer. It is sometimes sufficient to provide the elastic member 8 only on one of the left and right holder halves 11 and 12 and it is sometimes necessary to provide the elastic member 8 on both of the left and right holder halves 11 and 12.

In accordance with the embodiments shown in FIGS. 2 and 3, since when bringing the master information carriers 3 and 4 into close contact with the respective sides of the slave medium 2 under vacuum by evacuating the inner space 6, the master information carriers 3 and 4 are uniformly pushed by way of the elastic member 8 and accordingly, the master information carriers 3 and 4 can be uniformly brought into close contact with the respective sides of the slave medium 2 over the entire area without a gap formed therebetween, whereby a magnetization pattern accurately corresponding to the patterns on the master information carriers 3 and 4 can be recorded on (or transferred to) the slave medium 2.

The seal mechanism 13 can keep the air-tightness between the left and right holder halves 11 and 12 even if the slave medium 2, the master information carriers 3 and 4, and the elastic member 8 change in their thickness, by virtue of its cylinder-piston structure which permits a relative shift of the left and right holder halves 11 and 12.

Though, in the embodiments described above, a pair of master information carriers 3 and 4 are simultaneously brought into close contact with the respective sides of the slave medium 2 and the patterns on the master information carriers 3 and 4 are simultaneously transferred to the slave medium 2, one master information carrier may be brought into close contact with one side of the slave medium at one time and the patterns may be transferred to opposite sides of the slave medium 2 in sequence.

Further, though, in the embodiments described above, the transfer holder 10 is formed by two parts, the left and right holder halves, the transfer holder 10 may be formed by three or more parts with the seal mechanism 13 arranged as a separate part.

What is claimed is:

1. A magnetic transfer apparatus provided with a transfer holder in which a master information carrier and a slave medium are accommodated in an overlapping state where they are opposed to each other and held in close contact with each other, wherein the improvement comprises that
   the master information carrier and the slave medium overlapping each other are pressed against each other by hermetically closing the holder and evacuating the inner space of the holder.

2. A magnetic transfer apparatus as defined in claim 1 in which the transfer holder comprises at least two parts, first and second holder halves so that the first and second holder halves are moved relatively to each other in response to evacuation of the inner space of the transfer holder to press against each other the master information carrier and the slave medium overlapping each other.

3. A magnetic transfer apparatus as defined in claim 2 in which the first and second holder halves are connected by a seal mechanism.

4. A magnetic transfer apparatus as defined in claim 1 in which at least one elastic member is disposed between the transfer holder and at least one of the master information carrier and the slave medium overlapping each other.

5. A magnetic transfer apparatus as defined in claim 1 in which a mechanical pressure by a power source is applied to the transfer holder in addition to the pressure by said evacuation.

* * * * *